(12) United States Patent
Cheng et al.

(10) Patent No.: US 11,381,292 B2
(45) Date of Patent: Jul. 5, 2022

(54) METHOD AND APPARATUS FOR SIDELINK CSI ACQUISITION

(71) Applicant: FG Innovation Company Limited, Tuen Mun (HK)

(72) Inventors: Yu-Hsin Cheng, Hsinchu (TW); Chia-Hao Yu, Yilan (TW); Yung-Lan Tseng, Hsinchu (TW)

(73) Assignee: FG Innovation Company Limited, Tuen Mun (HK)

( * ) Notice: Subject to any disclaimer, the term of this patent is extended or adjusted under 35 U.S.C. 154(b) by 99 days.

(21) Appl. No.: 16/833,132

(22) Filed: Mar. 27, 2020

(65) Prior Publication Data

US 2020/0322024 A1 Oct. 8, 2020

Related U.S. Application Data

(60) Provisional application No. 62/828,482, filed on Apr. 3, 2019.

(51) Int. Cl.

| H04B 7/06 | (2006.01) |
|---|---|
| H04W 24/10 | (2009.01) |
| H04W 76/11 | (2018.01) |
| H04L 25/02 | (2006.01) |
| H04W 76/27 | (2018.01) |

(Continued)

(52) U.S. Cl.
CPC ....... *H04B 7/0626* (2013.01); *H04L 25/0226* (2013.01); *H04W 24/10* (2013.01); *H04W 52/52* (2013.01); *H04W 76/11* (2018.02); *H04W 76/27* (2018.02); *H04W 92/18* (2013.01)

(58) Field of Classification Search
CPC .... H04B 7/0626; H04W 76/11; H04W 24/10; H04W 76/27; H04W 52/52; H04W 92/18; H04L 25/0226
See application file for complete search history.

(56) References Cited

U.S. PATENT DOCUMENTS

| 2020/0177254 A1* | 6/2020 | Lee ........................ H04L 5/0051 |
| 2020/0280398 A1* | 9/2020 | Hwang ................. H04L 1/1819 |

(Continued)

FOREIGN PATENT DOCUMENTS

| CN | 107466068 A | 12/2017 |
| WO | 2018044080 A1 | 3/2018 |

(Continued)

OTHER PUBLICATIONS

Huawei "Introduction of 5G V2X sidelink features into TS 38 212" 3GPP TSG-RAN WG1 Meeting #99, R1-1913642, Dec. 6, 2019 (Dec. 6, 2019), section 8.3.1.1-section 8.4.1.1.

(Continued)

*Primary Examiner* — Deepa Belur
(74) *Attorney, Agent, or Firm* — ScienBiziP, P.C.

(57) ABSTRACT

A method for sidelink (SL) control information (CSI) acquisition performed by a UE is provided. The method includes receiving a first SCI format from another UE, the first SCI format including resource allocation information of a second SCI format; receiving the second SCI format from the another UE based on the first SCI format, the second SCI format including a CSI request field and a source identifier (ID) field corresponding to the another UE; and generating a CSI report triggered by the second SCI format.

20 Claims, 4 Drawing Sheets

100

(51) Int. Cl.
*H04W 52/52* (2009.01)
*H04W 92/18* (2009.01)

(56) References Cited

U.S. PATENT DOCUMENTS

| | | | | |
|---|---|---|---|---|
| 2020/0304272 | A1* | 9/2020 | Lee | H04L 5/0064 |
| 2020/0337024 | A1* | 10/2020 | Tang | H04L 5/0048 |
| 2021/0143882 | A1* | 5/2021 | Sarkis | H04L 1/1822 |
| 2021/0160014 | A1* | 5/2021 | Selvanesan | H04L 5/0053 |
| 2021/0204250 | A1* | 7/2021 | Ashraf | H04W 72/10 |
| 2022/0014338 | A1* | 1/2022 | Yoshioka | H04L 5/0057 |
| 2022/0015067 | A1* | 1/2022 | Li | H04W 72/085 |

FOREIGN PATENT DOCUMENTS

| | | | | |
|---|---|---|---|---|
| WO | WO-2020143059 A1 * | 7/2020 | | H04W 72/02 |
| WO | WO-2020177169 A1 * | 9/2020 | | |
| WO | WO-2020198981 A * | 10/2020 | | H04W 72/04 |

OTHER PUBLICATIONS

Ericsson "Physical layer structure for SL NR V2X" 3GPP TSG-RAN WG1 Meeting #95, R1-1813638, Nov. 2, 2018 (Nov. 2, 2018), section 5.1-section 5.2.

\* cited by examiner

100

Receive a first SCI format from a second UE, the first SCI format including resource allocation information of a second SCI format — 102

Receive the second SCI format from the second UE based on the first SCI format, the second SCI format including a CSI request field and a source ID field corresponding to the second UE — 104

Generate a CSI report triggered by the second SCI format — 106

Perform CSI measurement at a first time based on the SL RS configuration to generate the CSI report — 202

Perform sensing to obtain a radio resource for transmitting the CSI report, the radio resource allocated at a second time — 204

Drop the CSI report when a time difference between the first time and the second time is larger than a time threshold — 206

METHOD AND APPARATUS FOR SIDELINK CSI ACQUISITION

CROSS-REFERENCE TO RELATED APPLICATION(S)

The present disclosure claims the benefit of and priority of provisional U.S. Patent Application Ser. No. 62/828,482, filed on Apr. 3, 2019, entitled "Mechanism for CSI Acquisition on Sidelink Channel" ("the '482 provisional"). The disclosure of the '482 provisional is hereby incorporated fully by reference into the present disclosure.

FIELD

The present disclosure is related to wireless communication, and more particularly, to a method for sidelink (SL) channel state information (CSI) acquisition in cellular wireless communication networks.

BACKGROUND

Various efforts have been made to improve different aspects of wireless communication for cellular wireless communication systems, such as fifth generation (5G) New Radio (NR) by improving data rate, latency, reliability and mobility. Two user equipments (UE) in close proximity may establish a direct link without a need to go through a base station (B S).

Cellular wireless communication systems may use or enable device-to-device ("D2D") communication in which two or more UEs directly communicate with one another. D2D communication may also be referred to as SL communication.

The SL communication may be applied to vehicular communication services, also known as vehicle-to-everything (V2X) services. The V2X collectively refers to communication technology via all interfaces with vehicles, including vehicle-to-vehicle (V2V), vehicle-to-infrastructure (V2I), vehicle-to-person (V2P), and vehicle-to-network (V2N). Since data transmission on an SL channel may not pass through a BS, there is a need for an improved and efficient mechanism for a UE to acquire CSI on an SL channel.

SUMMARY

The present disclosure is related to a method for SL CSI acquisition performed by a UE in cellular wireless communication networks.

According to an aspect of the present disclosure, a UE is provided that includes one or more non-transitory computer-readable media containing computer-executable instructions embodied therein and at least one processor coupled to the one or more non-transitory computer-readable media. The at least one processor is configured to execute the computer-executable instructions to: receive a first SL control information (SCI) format from another UE, the first SCI format including resource allocation information of a second SCI format; receive the second SCI format from the another UE based on the first SCI format, the second SCI format including a CSI request field and a source identifier (ID) field corresponding to the another UE; and generate a CSI report triggered by the second SCI format.

According to another aspect of the present disclosure, a method for SL CSI acquisition performed by a UE is provided. The method includes: receiving a first SCI format from another UE, the first SCI format including resource allocation information of a second SCI format; receiving the second SCI format from the another UE based on the first SCI format, the second SCI format including a CSI request field and a source ID field corresponding to the another UE; and generating a CSI report triggered by the second SCI format.

BRIEF DESCRIPTION OF THE DRAWINGS

Aspects of the present disclosure are best understood from the following detailed description when read with the accompanying drawings. Various features are not drawn to scale. Dimensions of various features may be arbitrarily increased or reduced for clarity of discussion.

DETAILED DESCRIPTION

The following description contains specific information related to implementations of the present disclosure. The drawings and their accompanying detailed description are merely directed to implementations. However, the present disclosure is not limited to these implementations. Other variations and implementations of the present disclosure will be obvious to those skilled in the art.

Unless noted otherwise, like or corresponding elements among the drawings may be indicated by like or corresponding reference numerals. Moreover, the drawings and illustrations in the present disclosure are generally not to scale and are not intended to correspond to actual relative dimensions.

For the purpose of consistency and ease of understanding, like features may be identified (although, in some examples, not shown) by the same numerals in the drawings. However, the features in different implementations may be differed in other respects and shall not be narrowly confined to what is shown in the drawings.

The phrases "in one implementation," or "in some implementations," may each refer to one or more of the same or different implementations. The term "coupled" is defined as connected whether directly or indirectly via intervening components and is not necessarily limited to physical connections. The term "comprising" means "including, but not necessarily limited to" and specifically indicates open-ended inclusion or membership in the so-described combination, group, series or equivalent. The expression "at least one of A, B and C" or "at least one of the following: A, B and C" means "only A, or only B, or only C, or any combination of A, B and C."

The terms "system" and "network" may be used interchangeably. The term "and/or" is only an association relationship for describing associated objects and represents that multiple relationships may exist such that A and/or B may indicate that A exists alone, A and B exist at the same time, or B exists alone. The character "/" generally represents that the associated objects are in an "or" relationship.

For the purposes of explanation and non-limitation, specific details such as functional entities, techniques, protocols, and standards are set forth for providing an understanding of the disclosed technology. In other examples, detailed description of well-known methods, technologies, systems, and architectures are omitted so as not to obscure the description with unnecessary details.

Persons skilled in the art will recognize that any network function(s) or algorithm(s) disclosed may be implemented by hardware, software or a combination of software and hardware. Disclosed functions may correspond to modules which may be software, hardware, firmware, or any combination thereof.

A software implementation may include computer executable instructions stored on a computer readable medium such as memory or other type of storage devices. One or more microprocessors or general-purpose computers with communication processing capability may be programmed with corresponding executable instructions and perform the disclosed network function(s) or algorithm(s).

The microprocessors or general-purpose computers may include Applications Specific Integrated Circuitry (ASIC), programmable logic arrays, and/or using one or more Digital Signal Processor (DSPs). Although some of the disclosed implementations are directed to software installed and executing on computer hardware, alternative implementations implemented as firmware or as hardware or combination of hardware and software are well within the scope of the present disclosure. The computer readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture such as a Long Term Evolution (LTE) system, an LTE-Advanced (LTE-A) system, an LTE-Advanced Pro system, or a 5G NR Radio Access Network (RAN) typically includes at least one base station (BS), at least one UE, and one or more optional network elements that provide connection within a network. The UE communicates with the network such as a Core Network (CN), an Evolved Packet Core (EPC) network, an Evolved Universal Terrestrial RAN (E-UTRAN), a 5G Core (5GC), or an internet via a RAN established by one or more BSs.

A UE may include but is not limited to a mobile station, a mobile terminal or device, or a user communication radio terminal. The UE may be portable radio equipment that includes but is not limited to a mobile phone, a tablet, a wearable device, a sensor, a vehicle, or a Personal Digital Assistant (PDA) with wireless communication capability. The UE is configured to receive and transmit signals over an air interface to one or more cells in a RAN.

The BS may be configured to provide communication services according to at least a Radio Access Technology (RAT) such as Worldwide Interoperability for Microwave Access (WiMAX), Global System for Mobile communications (GSM) that is often referred to as 2G, GSM Enhanced Data rates for GSM Evolution (EDGE) RAN (GERAN), General Packet Radio Service (GPRS), Universal Mobile Telecommunication System (UMTS) that is often referred to as 3G based on basic wideband-code division multiple access (W-CDMA), high-speed packet access (HSPA), LTE, LTE-A, evolved LTE (eLTE) that is LTE connected to 5GC, NR (often referred to as 5G), and/or LTE-A Pro. However, the scope of the present disclosure is not limited to these protocols.

The BS may include but is not limited to a node B (NB) in the UMTS, an evolved node B (eNB) in LTE or LTE-A, a radio network controller (RNC) in UMTS, a BS controller (BSC) in the GSM/GERAN, a ng-eNB in an E-UTRA BS in connection with 5GC, a next generation Node B (gNB) in the 5G-RAN, or any other apparatus capable of controlling radio communication and managing radio resources within a cell. The BS may serve one or more UEs via a radio interface.

The BS is operable to provide radio coverage to a specific geographical area using a plurality of cells forming the RAN. The BS supports the operations of the cells. Each cell is operable to provide services to at least one UE within its radio coverage.

Each cell (often referred to as a serving cell) provides services to serve one or more UEs within its radio coverage such that each cell schedules downlink (DL) and optionally uplink (UL) resources to at least one UE within its radio coverage for DL and optionally UL packet transmissions. The BS can communicate with one or more UEs in the radio communication system via the plurality of cells.

A cell may allocate SL resources for supporting Proximity Service (ProSe) or Vehicle to Everything (V2X) service. Each cell may have overlapped coverage areas with other cells.

As discussed previously, the frame structure for NR supports flexible configurations for accommodating various next generation (e.g., 5G) communication requirements such as Enhanced Mobile Broadband (eMBB), Massive Machine Type Communication (mMTC), and Ultra-Reliable and Low-Latency Communication (URLLC), while fulfilling high reliability, high data rate and low latency requirements. The Orthogonal Frequency-Division Multiplexing (OFDM) technology in the 3rd Generation Partnership Project (3GPP) may serve as a baseline for an NR waveform. The scalable OFDM numerology such as adaptive sub-carrier spacing, channel bandwidth, and Cyclic Prefix (CP) may also be used.

Two coding schemes are considered for NR, specifically Low-Density Parity-Check (LDPC) code and Polar Code. The coding scheme adaption may be configured based on channel conditions and/or service applications.

At least DL transmission data, a guard period, and UL transmission data should be included in a transmission time interval (TTI) of a single NR frame. The respective portions of the DL transmission data, the guard period, and the UL transmission data should also be configurable based on, for example, the network dynamics of NR. SL resources may also be provided in an NR frame to support ProSe services or V2X services.

Two major issues are addressed by the present disclosure. The first issue is how to support CSI measurement with different time domain behaviors such as periodic, semi-persistent, and aperiodic (P/SP/AP). The second issue is how to support CSI measurement and CSI report in a two-stage SL control information (SCI) framework.

In one implementation, there may be a field (e.g., CSI request) for triggering a CSI report and/or CSI measurement in a SCI format. In one implementation, a CSI request state may be activated/deactivated by a medium access control (MAC) control element (CE). For example, a CSI request bit field in the MAC CE having a value "01" may refer to the first activated CSI trigger state.

In one implementation, there may be two resource allocation modes for SL transmissions. In resource allocation mode 1, the BS may schedule SL resource(s) to be used by a UE for SL transmission(s). In resource allocation mode 2, the UE may determine (e.g., the BS does not schedule) SL transmission resource(s) within SL resources configured by the BS/network or within preconfigured SL resources.

In the present disclosure, a UE transmitting (TX) a message (e.g., a SCI format, or a configuration) may also be referred to as a TX UE. A UE receiving (RX) a message may also be referred to as an RX UE.

The two-stage SCI framework may include a first SCI format and a second SCI format transmitted between two or more UEs. The first SCI format and the second SCI format may have two different SCI formats, specifically SCI format #1 and SCI format #2. The RX UE may obtain resource allocation information of the second SCI format according to the information provided in the first SCI format. The second SCI format may include a source ID field that indicates source ID information of the TX UE.

In one implementation, the source ID field may include part of the source ID of the TX UE. In one implementation, cyclic redundancy check (CRC) bits of the second SCI format may be scrambled by the source ID field. In one implementation, the second SCI format may include a CSI request field that triggers the RX UE to generate a CSI report.

Figure 1:
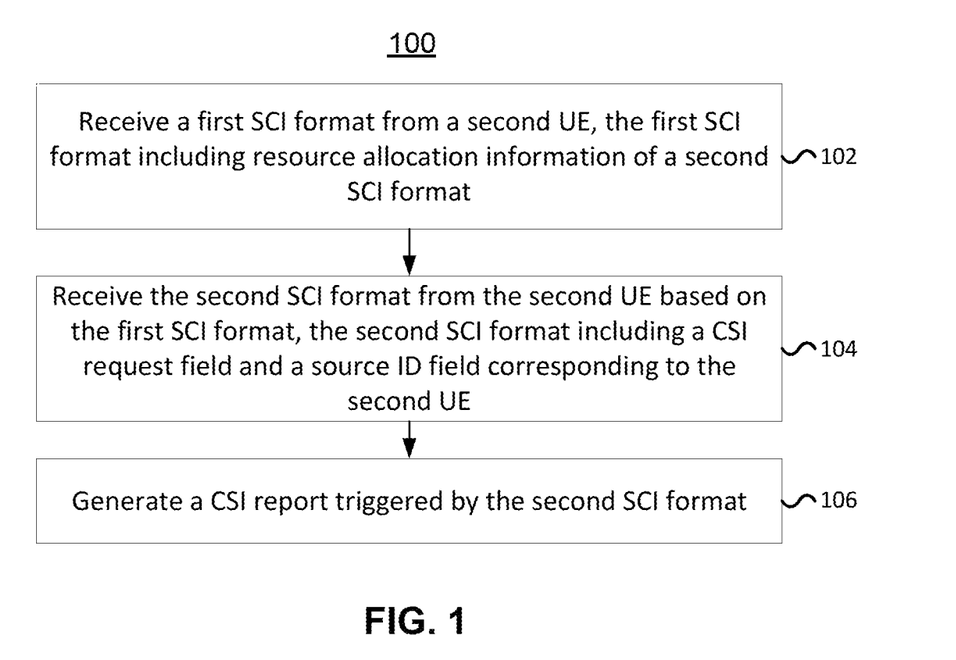
FIG. 1 illustrates a flowchart of a method for SL CSI acquisition according to an example implementation of the present disclosure.

FIG. 1 illustrates a flowchart of a method 100 for SL CSI acquisition according to an example implementation of the present disclosure. In action 102, a first UE (e.g., the RX UE) may receive a first SCI format from a second UE (e.g., the TX UE), the first SCI format including resource allocation information of a second SCI format. In action 104, the first UE may receive the second SCI format from the second UE based on the first SCI format, the second SCI format including a CSI request field and a source ID field that corresponds to the second UE. In action 106, the first UE may generate a CSI report triggered by the second SCI format.

Case 1: CSI Measurement with Different Time Domain Behaviors

Case 1-1: General Design for P/SP/AP RS Transmission

In one implementation, the RX UE may also receive an SL reference signal (RS) configuration for SL CSI measurement. The SL RS configuration may include at least one of a CSI reference signal (CSI-RS), a sounding reference signal (SRS), an automatic gain control (AGC) training RS, and a demodulation reference signal (DM-RS). For example, after the RX UE receives a CSI request from the TX UE, the RX UE may perform SL CSI measurement based on the SRS transmitted by the TX UE to generate the CSI report.

The CSI-RS may be a dedicated RS for the UE to measure/monitor CSI. The DM-RS may be a dedicated RS for the UE to decode data channels and control channels.

In one implementation, the SL RS configuration (also referred to as configuration-SL) may be received via SL radio resource control (RRC) signaling from the second UE. For example, the configuration-SL may be configured in PC5-RRC (e.g., RRC configuration transmitted on a SL channel). In one implementation, the configuration-SL may also be carried in other configurations or signaling, including Uu-RRC (e.g., RRC configuration transmitted on a Uu channel), preconfiguration, SL-SIB (e.g., a system information block transmitted on a SL channel), Uu-SIB (e.g., a system information block transmitted on a Uu channel), and SL-MIB (e.g., a master information block transmitted on a SL channel).

In one implementation, a resource for a physical SL control channel (PSCCH) may be configured as $(t_0^{SL}, t_1^{SL}, \ldots, t_T^{SL})$, which indicates possible transmission occasions for the PSCCH. PSCCH for SCI format #1 and SCI format #2 may be separately/independently configured.

In one implementation, the CSI-RS may be transmitted on the symbol(s) before the PSCCH, and the time offset between the CSI-RS and the PSCCH may be configured in the configuration-SL. In one implementation, the CSI-RS resource may fully or partially overlap the PSCCH in the time domain, and the configuration-SL may indicate on which symbols the CSI-RS are transmitted. In one implementation, a period of the CSI-RS may be the same as a period of the PSCCH transmission. In one implementation, the UE may assume periodicity of the CSI-RS is the same as PSCCH if the CSI-RS is a periodic or semi-persistent transmission.

In one implementation, the time domain resource of the CSI-RS may fully or partially overlap the time domain resource of the SL-MIB/SL-SIB, and the time domain resource and frequency domain resource for the CSI-RS may be preconfigured in the UE and/or predefined in a technical specification (TS). In one implementation, the UE may assume periodicity of the CSI-RS is the same as SL-MIB/SL-SIB if the CSI-RS is periodic or semi-persistent transmission.

In one implementation, a CSI measurement configuration in the configuration-SL may include information of DM-RS ports that are used for measuring CSI.

In one implementation, the CSI-RS resource may fully or partially overlap a physical SL feedback channel (PSFCH) in the time domain. The UE may receive detailed time and frequency domain resource information via the configuration-SL. In one implementation, the SL reference signal for a CSI report may be located in a slot/subframe/subslot/symbol which is valid for SL transmission/reception. In one implementation, valid slots may include only UL slots and slots without an SL synchronization signal (SLSS).

In one implementation, a CSI report transmitted in an SL slot/subframe/subslot/symbol index "n" may be based on an SL reference signal located on a single SL slot/subframe/subslot/symbol index "$n_{CSI\_ref}$". A time threshold on (n-$n_{CSI\_ref}$) may indicate a closest valid slot/subframe/subslot/symbol for the RS used for CSI measurement before the UE is triggered for CSI reporting. For example, if the time threshold is 8 and the CSI report is transmitted in slot n, the slot $n_{CSI\_ref}$ may not be a valid slot for CSI measurement if $n_{CSI\_ref}$<n−8, and the slot $n_{CSI\_ref}$ may be a valid slot for CSI measurement if n−8≤$n_{CSI\_ref}$<n.

In one implementation, the UE may drop the CSI report if a time difference between a transmission of the SL RS and a transmission of the CSI report is greater than the time threshold. The CSI report may be considered an outdated CSI report if the time difference is greater than the time threshold and the UE may ignore the outdated CSI report or may not update the CSI for the triggered CSI report in slot n. The time threshold may be predefined or configured in the configuration-SL.

Figure 2:
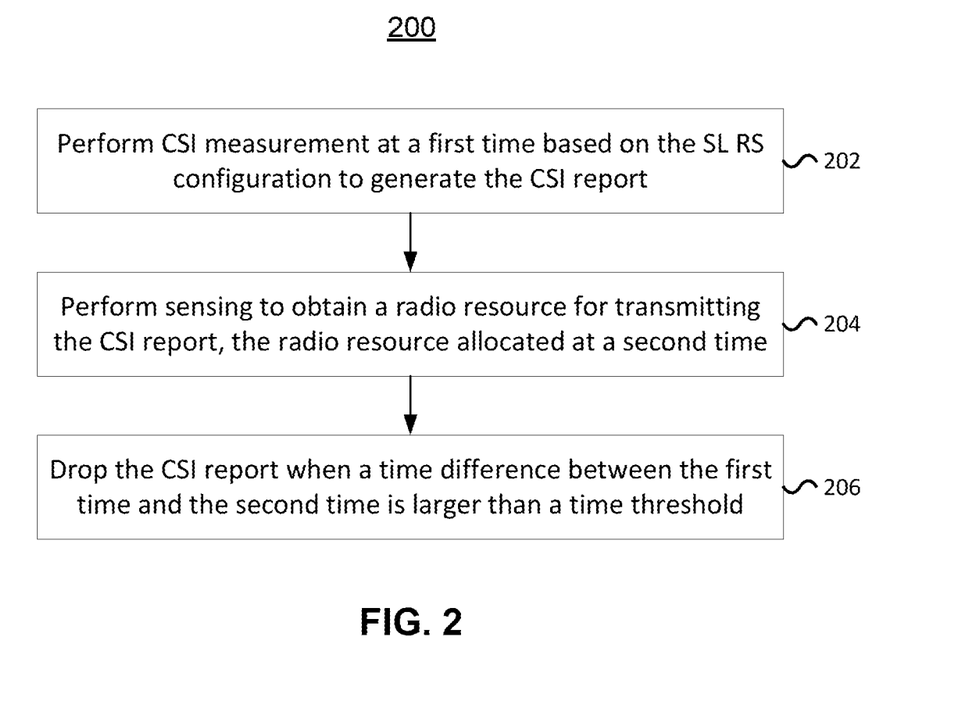
FIG. 2 illustrates a flowchart of a method for conditional CSI reporting performed by a UE according to an example implementation of the present disclosure.

FIG. 2 illustrates a flowchart of a method 200 for conditional CSI reporting performed by a UE according to an example implementation of the present disclosure. Method 200 may be performed by the first UE after receiving the CSI request from the second UE in action 104 illustrated in FIG. 1.

In action 202, the UE may perform CSI measurement at a first time based on the SL RS configuration to generate the CSI report. The UE may perform CSI measurement based on an SL RS transmitted at the first time, the SL RS being configured in the SL RS configuration.

In action 204, the UE may obtain a radio resource for transmitting the CSI report by sensing, the radio resource allocated at a second time. That is, the UE may need to perform sensing on an SL channel to obtain an available radio resource for transmitting the CSI report. In action 206, the UE may drop the CSI report when a time difference between the first time and the second time is greater than a time threshold.

Case 1-2: Semi-Persistent RS Transmission

In one implementation, a MAC CE of an SL to activate/deactivate semi-persistent (SP) CSI-RS for measurement may include at least resource pool configuration information (e.g., an index) and/or periodicity of a SP CSI-RS transmission. It should be noted that in some implementations, a resource allocation pattern and/or an offset within one slot/subslot for the CSI-RS may be fixed such that the MAC-CE may only need to indicate the periodicity for the CSI-RS.

In one implementation, the UE may expect to activate only one SP CSI-RS for measurement. If the UE has already activated a first SP CSI-RS for measurement indicated by a first MAC CE, the UE may consider the first SP CSI-RS deactivated when the UE receives a second MAC CE that indicates an activation of a second SP CSI-RS for measurement. The UE may then consider the second SP CSI-RS indicated by the second MAC CE as activated.

Case 2: CSI Measurement and/or Report in Two-Stage SCI Framework

Case 2-1: RS Resource Configuration and CSI Report Configuration

In one implementation, the SL RS configuration may be resource pool specific, while a CSI report configuration may be bandwidth part (BWP) specific, carrier specific, UE specific, or a combination thereof. Therefore, the CSI report configuration for a P/SP/AP CSI report may include information of at least one of the resource pool, the carrier, and the BWP in which the measured RSs are transmitted. The CSI report may include at least one of a BWP ID, a carrier ID, and a resource pool ID based on the SL RS configuration.

In one implementation, the CSI request field in the second SCI format may also be BWP specific, carrier specific, UE specific, or a combination thereof. Therefore, a CSI request configuration for P/SP/AP CSI report may include information of at least one of the resource pool, the carrier, and the BWP in which the measured RSs are transmitted (e.g., resource pool ID, carrier ID, and BWP ID).

In one implementation, both the SL RS configuration and the CSI report configuration may be resource pool specific. The UE may only transmit a CSI report whose CSI information is derived based on measurement results of RSs in the current active/configured resource pool. For example, the UE may only associate an index of an RS for CSI measurement with an index of a CSI report configuration that belongs to the same resource pool.

In one implementation, the CSI request may also be resource pool specific. A UE may only transmit a CSI report whose CSI information is derived based on measurement results of RSs in the current active/configured resource pool.

For example, UE may only associate a trigger state of the CSI request with an RS for CSI measurement that belongs to the same resource pool. The trigger state of the CSI request may be referred to in the 3GPP TS Release 15. The UE may be configured with a configuration-SL that indicates whether a CSI request field is in the first SCI format or the second SCI format or both.

Case 2-2: CSI Request Field in Two-Stage SCI Framework

A two-stage SCI framework may include transmission of the first SCI format and the second SCI format. In one implementation, the first SCI format may include a CSI request field that triggers the UE to generate a CSI report. The CSI request field in the first SCI format may indicate information (e.g., index or resource allocation) of an RS for CSI measurement. The second SCI format may indicate information (e.g., index or resource allocation) of a physical SL shared channel (PSSCH) for transmission of the CSI report.

In one implementation, a CSI request field in an SCI format may trigger a P/SP/AP CSI report, and the UE may expect resource allocation in the SCI format. For example, if the UE is triggered to provide a semi-persistent CSI report, the UE may expect the SCI format to indicate a reserved resource for repetitive transmission. Referring to FIG. 1, in one implementation the second SCI format may further include resource allocation information for transmitting the CSI report.

In one implementation, there may be no CSI request configuration in the configuration-SL. The UE may associate the CSI request field in the SCI format directly with a CSI report ID. For example, if a value of the CSI request field in the SCI format is "11", the UE may directly trigger a CSI report with ID #3.

In one implementation, the CSI request field that triggers a CSI report and/or CSI measurement may be contained only in the first SCI format. In this implementation the number of bits in the CSI request field may be resource pool specific, BWP specific, carrier specific, or a combination thereof. Other UEs may perform sensing according to the CSI request field in the first SCI format.

In one implementation, the CSI request field that triggers a CSI report and/or CSI measurement may be contained only in the second SCI format. In this implementation the number of bits in the CSI request field may be resource pool specific, carrier specific, BWP specific, UE specific, or a combination thereof.

In one implementation, the CSI request field that triggers a CSI report and/or CSI measurement may be contained in both the first and second SCI formats. In this implementation the number of bits in the CSI request field may be resource pool specific, carrier specific, BWP specific, UE specific, or a combination thereof. If the UE is triggered for a CSI report by both the first and second SCI formats, the UE may transmit the CSI report triggered by the second SCI format, or transmit the CSI reports triggered by both the first and second SCI formats.

Case 2-3: Semi-Persistent CSI Report Activation in Two-Stage SCI Framework

In one implementation, the UE may trigger/activate/deactivate a semi-persistent CSI report based on one or more specific bit fields in the first SCI format. The specific bit fields may include at least one of a resource allocation, a modulation and coding scheme (MCS), a hybrid automatic repeat request (HARQ) ID, a redundant version, a reserved period indicator, and the number of repetitions. It should be noted that in this case other UEs may perform sensing according to the CSI request field.

In one implementation, the UE may trigger a semi-persistent CSI report based on one or more specific bit fields in the second SCI format. The specific bit fields may include at least one of resource allocation, an MCS, a HARQ ID, a redundant version, a reserved period indicator, and a number of repetitions.

A period of the semi-persistent CSI report may be indicated directly in at least one of the first SCI format and the second SCI format. It should be noted that the reserved period indicator in a SCI format may indicate resources with a reserved interval from a previous transmission from the TX UE. If the RX UE receives the reserved period indicator, the RX UE may know that the TX UE will transmit future transport blocks using those reserved resources.

Case 2-4: Phase Tracking Reference Signal (PTRS) Resource Allocation Indicator in Two-Stage SCI Framework In one implementation, the UE may trigger PTRS monitoring based on a corresponding bit field in the first SCI format. The bit field may indicate information for PTRS resource allocation (e.g., port index, PTRS configuration index, and associated DM-RS port index(s)/port group(s)). It should be noted that in this case other UEs may perform sensing according to the bit field for PTRS resource allocation.

In one implementation, the UE may trigger PTRS monitoring based on a corresponding bit field in the second SCI format. The bit field may indicate information for PTRS resource allocation (e.g., port index, PTRS configuration index, and associated DM-RS port index).

Case 3: UE Performs Sensing to Find Resource for Transmitting a CSI Report

In one implementation, the UE may perform CSI measurement and/or CSI reporting only when the channel condition is better than a quality threshold. The triggering condition (e.g., the quality threshold) may be configured in the configuration-SL. In one implementation, there may be multiple triggering conditions corresponding to different quality of service (QoS) requirements. The QoS requirements may include at least one of a ProSe per-packet priority (PPPP) value, a logical channel or a logical channel group, a vehicle QoS identifier (VQI) or 5G QoS identifier (5QI) value, and a priority value.

Referring to FIG. 1, in one implementation the first UE may determine an SL channel condition, and the first UE may transmit the CSI report to the second UE when the SL channel condition is better than a quality threshold. The SL channel condition may be related to a sensing result. In one implementation, the first UE may determine the SL channel condition based on at least one of an SL reference signal received power (SL-RSRP), an SL signal to interference plus noise ratio (SL-SINR), a channel busy ratio (CBR), and a channel occupancy ratio (CR). For example, the first UE may measure at least one of an average SL-RSRP, an average SL-SINR, a CBR, and a CR over a measurement period. In one implementation, the first UE may continuously monitor the SL channel condition even if the first UE does not receive a CSI request from the second UE.

In one implementation, there may be a CSI indication field in a SCI format that schedules a PSSCH transmission. The UE that receives the SCI format may know there is a CSI report in the PSSCH scheduled by the SCI format if the CSI indication field is set as true.

Referring to FIG. 1, the first UE may transmit a third SCI format to the second UE (e.g., after action 106). The third SCI format may include a CSI indication field and resource allocation information of a first PSSCH transmission. The CSI indication field may indicate that the first PSSCH transmission includes the CSI report generated in action 106.

There may be one or more CSI report configurations in the configuration-SL. The CSI indication field may be a one-bit field if there is one CSI report configuration. In one implementation, if there are multiple CSI report configurations in the configuration-SL, the CSI indication field in the SCI format may indicate information (e.g., an index) of one of the CSI report configurations. For example, if the UE is configured with three CSI report configurations via the configuration-SL, the CSI indication field may have $\log_2$(the number of CSI report configurations+1)=2 bits. In one implementation, the UE may expect the number of bits of the CSI request field (e.g., in the second SCI format in action 104) is also $\log_2$(number of CSI report configurations+1)=2. If the CSI request field has a value "01" (which may correspond to index #1), the UE may trigger a CSI measurement and/or CSI report according to the first CSI report configuration in the configuration-SL. In one implementation, a mapping relationship between the CSI indication field and the CSI report may be configured in the configuration-SL.

In one implementation, the CSI indication field may be the same as the CSI request field. Referring to FIG. 1, the CSI request field may trigger a CSI report in a SCI format transmitted from the second UE to the first UE, whereas the CSI indication field (which may be the same as the CSI request field) in another SCI format transmitted from the first UE to the second UE (e.g., for scheduling a transmission of the CSI report) may indicate information of the CSI report.

In one implementation, the second SCI format may further include resource allocation information of a second PSSCH transmission. The resource allocated by the second SCI format may be used for transmitting the CSI report or receiving data depending on the value of the CSI request field in the second SCI format.

The first UE may transmit the CSI report to the second UE in the second PSSCH transmission when the CSI request field indicates that the CSI report is triggered. The first UE may receive data from the second UE in the second PSSCH transmission when the CSI request field indicates that the CSI report is not triggered.

Figure 3:
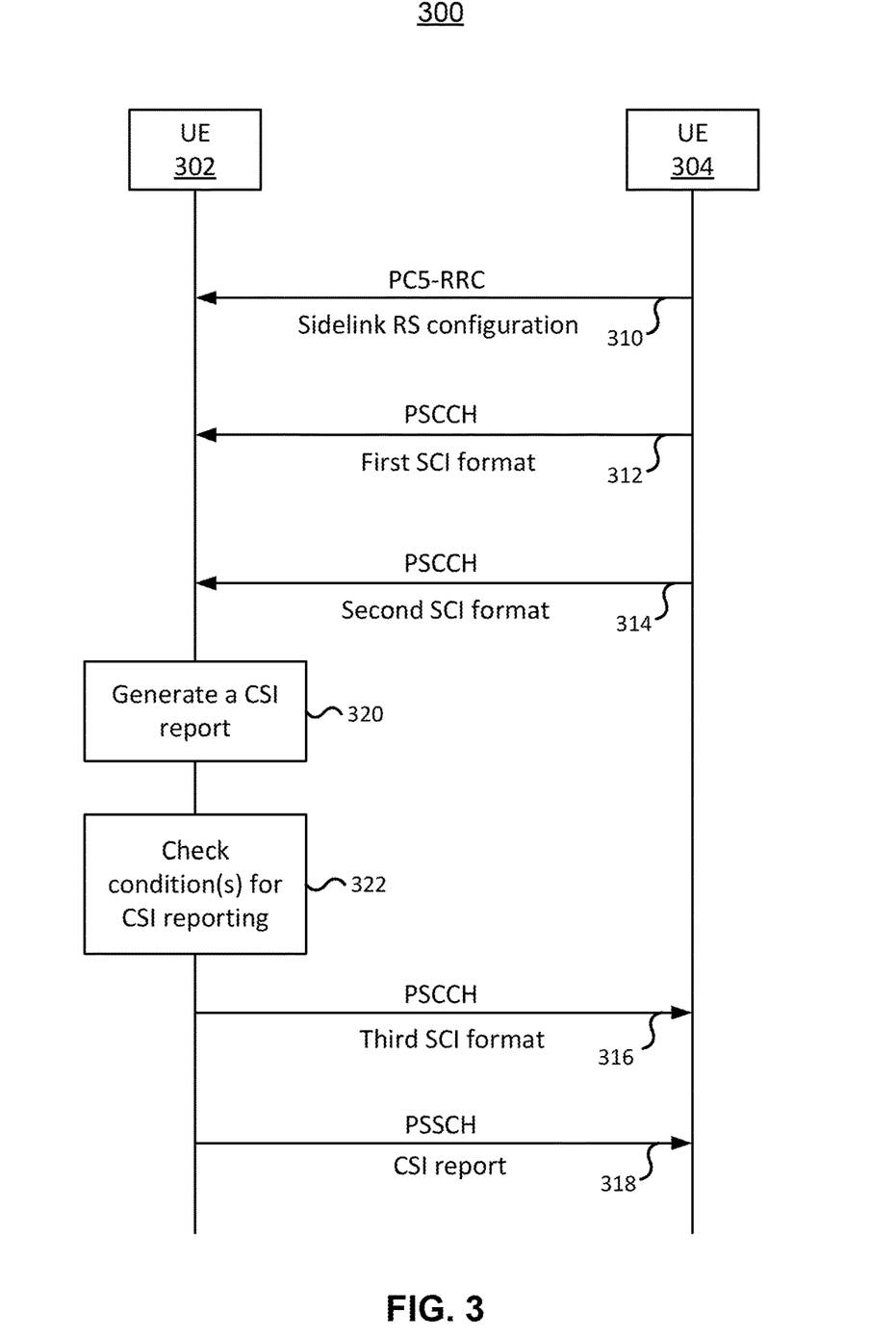
FIG. 3 includes a diagram illustrating a procedure of CSI acquisition on an SL channel according to an example implementation of the present disclosure.

FIG. 3 includes a diagram 300 illustrating a procedure of CSI acquisition on an SL channel according to an example implementation of the present disclosure. UE 302 and UE 304 may have established unicast SL linkage.

In action 310, UE 302 may receive an SL RS configuration from UE 304 via PC5-RRC. The SL RS configuration may include at least one of a CSI resource configuration, a CSI report configuration, a CSI request configuration, and a configuration for conditional CSI reporting. It should be noted that an SL RS configuration may be transmitted via different signaling.

In action 312, UE 302 may receive the first SCI format from UE 304 via a PSCCH. The first SCI format may include resource allocation information of the second SCI format.

In action 314, UE 302 may receive the second SCI format from UE 304 via a PSCCH. The second SCI format may include a CSI request field and a source ID field that corresponding to UE 304.

In action 320, UE 302 may generate a CSI report triggered by the second SCI format. The first SCI format may be SCI format #1, and the second SCI format may be SCI format #2.

In action 322, UE 302 may check condition(s) for CSI reporting. In one implementation the condition(s) for CSI reporting may be configured in the SL RS configuration transmitted in action 310.

UE 302 may transmit the CSI report generated in action 320 when the condition(s) for CSI reporting in action 322 are met. The condition(s) for CSI reporting may include at least one of a channel quality condition and a time offset condition.

The time offset condition may be met if a time difference between the time at which the RS for CSI measurement is transmitted and the time at which the CSI report is transmitted is greater than a time threshold. UE 302 may drop the CSI report if the time offset condition is not met.

In one implementation, the channel quality condition may be met if an SL channel condition measured by UE 302 is better than a quality threshold. UE 302 may also drop the CSI report if the channel quality condition is not met.

It should be noted that action 322 may be optional. UE 302 may transmit the CSI report to UE 304 without performing action 322.

In action 316, UE 302 may transmit the third SCI format to UE 304 via a PSCCH. The third SCI format may schedule a PSSCH transmission for the CSI report. In one implementation, the third SCI format may include a CSI indication field indicating that the PSSCH transmission scheduled by the third SCI format includes the CSI report.

In action 318, UE 302 may transmit the CSI report to UE 304 via a PSSCH. The PSSCH in action 318 may be scheduled by the third SCI format in action 316. In one implementation, the PSSCH in action 318 may be scheduled by the second SCI format in action 314. In this case action 316 is optional.

An example SL RS configuration transmitted in action 310 is provided below, where RI stands for Rank Indicator, and CQI stands for Channel Quality Indicator.

```
SL-RRC configuration::{
SL-resourcepool::{
  ...
  - CSI resource configuration
    - ID: #0
    - RS type: CSI-RS
    - time domain information: (#3, #4) symbol of PSSCH
    - frequency domain information: (#2, #6) subcarrier
    ...
  - CSI resource configuration
    - ID: #1
    - RS type: CSI-RS
    - time domain information: (#5, #6) symbol of PSSCH
    - frequency domain information: (#1, #5) subcarrier
    ...
  - CSI report configuration:
    - ID: #0
    - report quantity: CQI
    - measurement RS: RS configuration ID #0
    ...
  - CSI report configuration:
    - ID: #1
    - report quantity: RI
    - measurement RS: RS configuration ID #0
    ...
  - CSI report configuration:
    - ID: #2
    - report quantity: RI and CQI
    - measurement RS: RS configuration ID #1
    ...
  - CSI request configuration:
    - trigger state ID: #1
    - triggered CSI report: ID#0
    - slot offset for CSI measurement: 2 slots
    ...
  - CSI request configuration:
    - trigger state ID: #2
    - triggered CSI report: ID#1
    - slot offset for CSI measurement: 3 slots
    ...
```

-continued

```
  - CSI request configuration:
    - trigger state ID: #3
    - triggered CSI report: ID#2
    - slot offset for CSI measurement: 4 slots
    ...
  }
}
```

For example, UE 302 may receive the first SCI format in slot n, where n is a positive integer. The first SCI format may indicate the second SCI format is transmitted 2 slots later.

UE 302 may receive the second SCI format in slot n+2. The second SCI format may include a CSI request field having a value "11," indicating the CSI request configuration having ID #3.

The CSI request configuration #3 corresponds to a CSI report configuration having ID #2 and a slot offset for CSI measurement being 4 slots. The CSI report configuration #2 corresponds to RS configuration having ID #1 and a report quality being RI and CQI. The RS configuration #1 indicates CSI-RS and the corresponding time domain information and frequency domain information. Therefore, UE 302 may monitor the CSI-RS in the (#5, #6) symbol and (#1, #5) subcarrier in slot n+6, which is 4 slots later than the second SCI format.

The second SCI format may indicate a reserved period for UE 302 to transmit the CSI report. The reserved period may be 8 slots after the slot in which UE 302 successfully received the second SCI format. UE 302 may transmit the CSI report with CQI and RI according to the CSI report configuration #2 in slot n+10.

In one implementation, the RS type of a CSI resource configuration may include DM-RS in a PSCCH. An example SL RS configuration may include fields as follows:

```
  CSI resource configuration
    ID: #0
    RS type: DM-RS of PSCCH with SCI format #1
  ...
  CSI resource configuration
    ID: #1
    RS type: DM-RS of PSCCH with SCI format #2
  ...
  CSI resource configuration
    ID: #2
    RS type: CSI-RS
    time domain information: #3 symbol of PSCCH
    frequency domain information: (#2, #6) subcarrier
```

In this example, UE 302 may measure a signal quality, such as RI and CQI, of the DM-RS in the PSCCH that is used for decoding the second SCI format (e.g., SCI format #2) if the CSI request field is associated with the CSI resource configuration #1. It should be noted that UE 304 may indicate to UE 302 precoding information of the DM-RS for the second SCI format. The precoding information may be carried in the second SCI format. UE 302 may calculate the signal quality according to the precoding information.

In one implementation, the CSI report configuration may be UE specific. The CSI resource configuration may be resource pool specific. There may be no CSI request configuration. An example SL RS configuration is provided below:

```
SL-RRC configuration::{
```

```
SL-resourcepool::{
    - resource pool ID: ID#1
    ...
    - CSI resource configuration
        - ID: #0
        - RS type: CSI-RS
        - time domain information: #3 symbol of PSCCH
        - frequency domain information: (#2, #6) subcarrier
        ...
- CSI resource configuration
    - ID: #1
    - RS type: DM-RS of PSCCH with SCI format#1
    ...
}
SL-resourcepool::{
    - resource pool ID: ID#2
    ...
    - CSI resource configuration
        - ID: #0
        - RS type: CSI-RS
        - time domain information: #2 symbol of PSCCH
        - frequency domain information: (#1, #5) subcarrier
        ...
    - CSI resource configuration
        - ID: #1
        - RS type: DM-RS of PSCCH with SCI format#1
        ...
}
CSI-report configuration ::{
    - CSI report configuration:
        - ID: #0
        - resource pool ID: ID#1
        - report quantity: RI
        - measurement RS: RS configuration ID #0
        ...
    - CSI report configuration:
        - ID: #1
        - resource pool ID: ID#1
        - report quantity: RI and CQI
        - measurement RS: RS configuration ID #1
        ...
    - CSI report configuration:
        - ID: #2
        - resource pool ID: ID#2
        - report quantity: RI
        - measurement RS: RS configuration ID #1
        ...
    - CSI report configuration:
        - ID: #3
        - resource pool ID: ID#1
        - report quantity: RI and CQI
        - measurement RS: RS configuration ID #0
        ...
}
}
```

In one implementation, conditions to be checked in action 322 may be configured in the SL RS configuration. An example SL RS configuration is provided below:

```
SL-RRC configuration::{
SL-resourcepool::{
    ...
    - CSI resource configuration
        - ID: #0
        - RS type: DM-RS of PSCCH with SCI format#1
        ...
    - CSI resource configuration
        - ID: #1
        - RS type: DM-RS of PSCCH with SCI format#2
        ...
    - CSI resource configuration
        - ID: #2
        - RS type: CSI-RS
        - time domain information: #3 symbol of PSCCH
        - frequency domain information: (#2, #6) subcarrier
        ...
    - CSI report configuration:
        - ID: #0
        - report quantity: CQI
        - measurement RS: RS configuration ID #0
        ...
    - CSI report configuration:
        - ID: #1
        - report quantity: RI
        - measurement RS: RS configuration ID #0
        ...
    - CSI report configuration:
        - ID: #2
        - report quantity: RI and CQI
        - measurement RS: RS configuration ID #1
        ...
    - Conditional CSI report configuration:
        - triggered CSI report ID: #1
        - triggering condition: SL-RSRP smaller than X dB
        ...
        - triggered CSI report ID: #2
        - triggering condition: SL-SINR smaller than Y dB
        ...
}
}
```

In this example, based on the CSI resource configuration, UE 302 may monitor DM-RS of PSCCH for SCI format #1 (CSI resource configuration ID #0) in every slot. UE 302 may monitor DM-RS of PSCCH for SCI format #2 in every slot (CSI resource configuration ID #1). UE 302 may monitor CSI-RS on (#3, #6) subcarrier of the third symbol in PSCCH (CSI resource configuration ID #2).

UE 302 may be triggered to provide CSI report #2, which corresponds to the CSI resource configuration ID #1. The reference signal to be measured is DM-RS of PSCCH with SCI format #2. Based on the conditional CSI report configuration, UE 302 may transmit CSI report #2 if the SL-SINR of DM-RS of PSCCH for SCI format #2 is lower than Y dB. UE 302 may transmit the CSI report in a next possible transmission occasion. In one implementation, UE 302 may perform sensing to obtain a resource for transmission of the CSI report. UE 302 may consider the priority of a transport block and/or a logical channel to determine whether to transmit the CSI report in the resource.

UE 302 may transmit CQI and RI of the DM-RS of PSCCH for SCI format #2 in the CSI report. UE 302 may also transmit a SCI format that includes a CSI indication field. The CSI indication field having a value "1" may indicate that there is a CSI report in the PSSCH scheduled by the SCI format. UE 304 may receive and decode the CSI report from UE 302 after receiving the SCI format including the CSI indication field.

Figure 4:
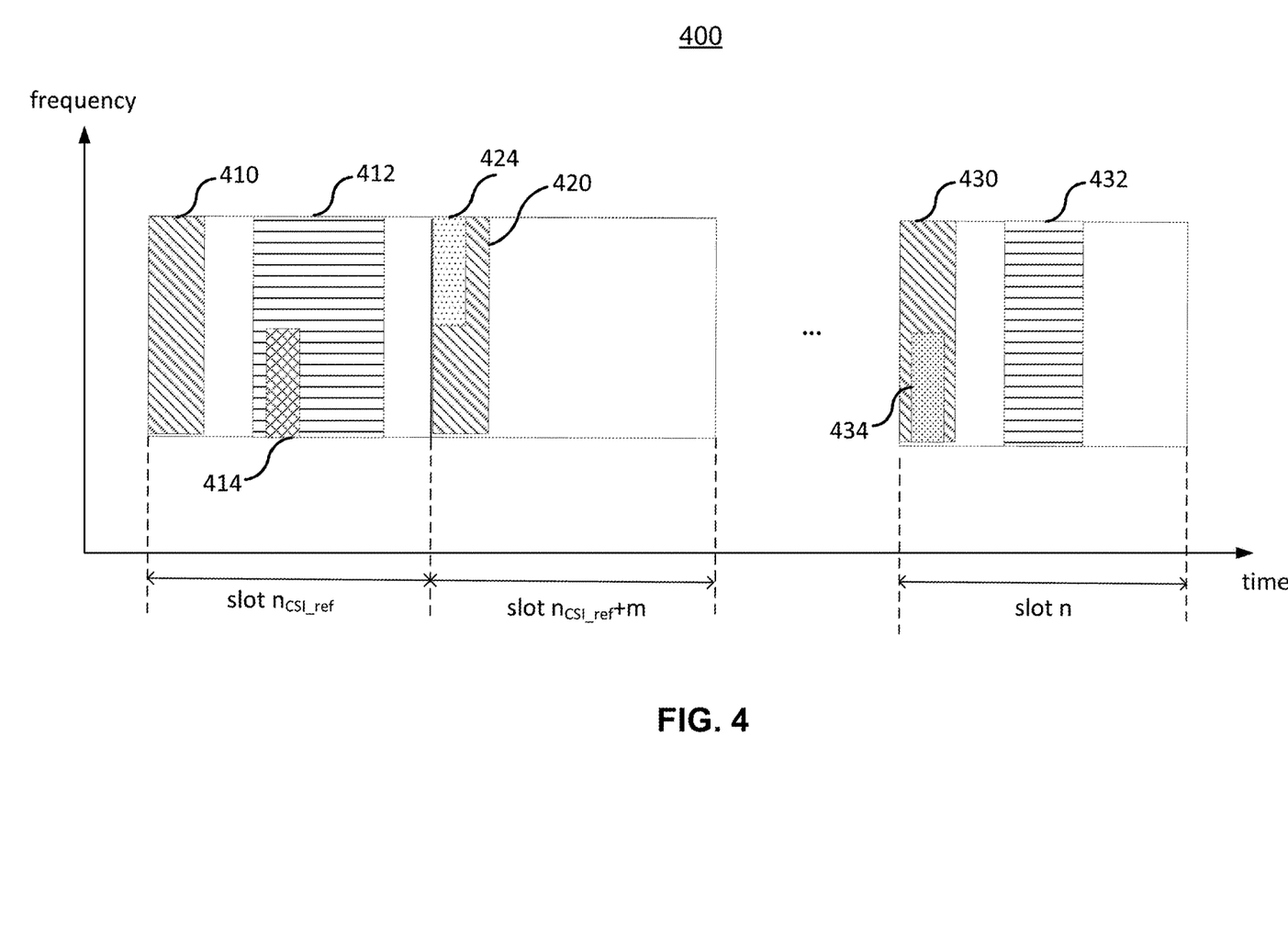
FIG. 4 includes a diagram illustrating resource allocation for CSI acquisition according to an example implementation of the present disclosure.

FIG. 4 includes a diagram 400 illustrating resource allocation for CSI acquisition according to an example implementation of the present disclosure. UE 302 receives a SCI format 424 including a CSI request field via a PSCCH 420 in slot $n_{CSI\_ref}+m$, $m \geq 1$. The closest valid SL slot for CSI measurement may be slot $n_{CSI\_ref}$, which may contain a PSCCH 410 and a PSSCH 412 in which an RS for CSI measurement 414 is transmitted.

UE 302 may perform sensing to determine if there is an available resource for transmitting the CSI report to UE 304. For example, UE 302 may obtain an available resource for transmitting the CSI report in slot n. UE 302 may check whether $(n-n_{CSI\_ref})$ is greater than a time threshold. After determining that $(n-n_{CSI\_ref})$ is less than the time threshold, UE 302 may generate an SCI format 434 to indicate the resource for transmission of the CSI report to UE 304.

The SCI format 434 may be transmitted via a PSCCH 430 in slot n. The SCI format 434 may include a CSI indication field, which may indicate a specific CSI report configuration in the SL RS configuration. The SCI format 434 may schedule a PSSCH 432 in which the CSI report is transmitted.

Figure 5:
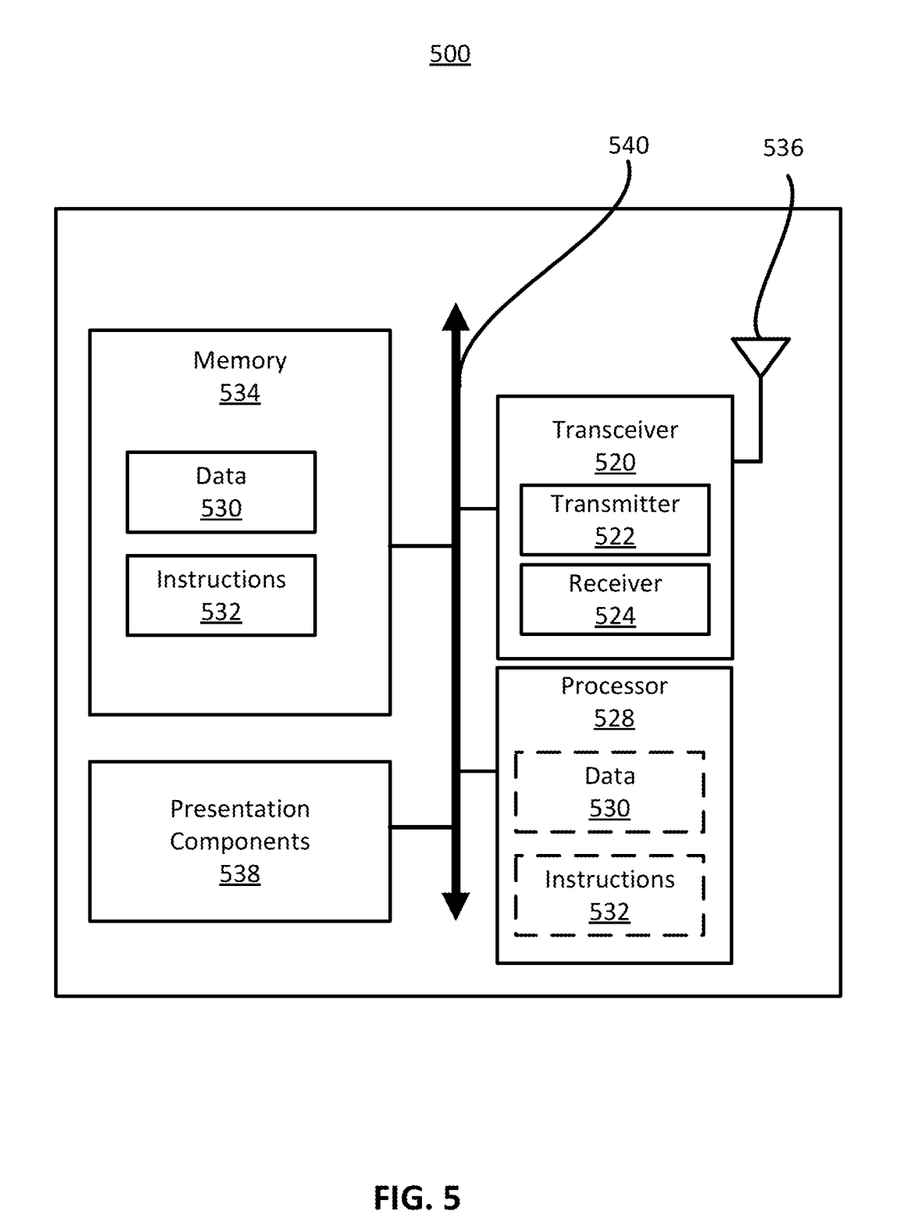
FIG. 5 is a block diagram illustrating a node for wireless communication in accordance with various aspects of the present disclosure.

FIG. 5 is a block diagram illustrating a node 500 for wireless communication according to the present disclosure. As illustrated in FIG. 5, the node 500 may include a transceiver 520, a processor 528, a memory 534, one or more presentation components 538, and at least one antenna 536. The node 500 may also include an RF spectrum band module, a BS communications module, a network communications module, and a system communications management module, Input/Output (I/O) ports, I/O components, and a power supply (not shown).

Each of the components may directly or indirectly communicate with each other over one or more buses 540. The node 500 may be a UE or a BS that performs various disclosed functions with reference to FIGS. 1 through 4.

The transceiver 520 has a transmitter 522 (e.g., transmitting/transmission circuitry) and a receiver 524 (e.g., receiving/reception circuitry) and may be configured to transmit and/or receive time and/or frequency resource partitioning information. The transceiver 520 may be configured to transmit in different types of subframes and slots including but not limited to usable, non-usable and flexibly usable subframes and slot formats. The transceiver 520 may be configured to receive data and control channels.

The node 500 may include a variety of computer-readable media. Computer-readable media may be any available media that may be accessed by the node 500 and include both volatile and non-volatile media, removable and non-removable media.

The computer-readable media may include computer storage media and communication media. Computer storage media include both volatile and non-volatile, removable and non-removable media implemented in any method or technology for storage of information such as computer-readable instructions, data structures, program modules or data.

Computer storage media include RAM, ROM, EEPROM, flash memory or other memory technology, CD-ROM, Digital Versatile Disks (DVD) or other optical disk storage, magnetic cassettes, magnetic tape, magnetic disk storage or other magnetic storage devices. Computer storage media do not include a propagated data signal. Communication media typically embody computer-readable instructions, data structures, program modules or other data in a modulated data signal such as a carrier wave or other transport mechanism and include any information delivery media.

The term "modulated data signal" refers to a signal that has one or more of its characteristics set or changed in such a manner as to encode information in the signal. Communication media include wired media such as a wired network or direct-wired connection, and wireless media such as acoustic, RF, infrared and other wireless media. Combinations of any of the previously listed components are also included within the scope of computer-readable media.

The memory 534 may include computer-storage media in the form of volatile and/or non-volatile memory. The memory 534 may be removable, non-removable, or a combination thereof. Example memory includes solid-state memory, hard drives, optical-disc drives, etc.

As illustrated in FIG. 5, the memory 534 may store computer-readable, computer-executable instructions 532 (e.g., software codes) that are configured to cause the processor 528 to perform various functions disclosed herein, for example, with reference to FIGS. 1 through 4. Alternatively, the instructions 532 may not be directly executable by the processor 528 but be configured to cause the node 500 (e.g., when compiled and executed) to perform various functions disclosed herein.

The processor 528 (e.g., having processing circuitry) may include an intelligent hardware device, e.g., a Central Processing Unit (CPU), a microcontroller, an ASIC, etc. The processor 528 may include memory.

The processor 528 may process the data 530 and the instructions 532 received from the memory 534, and information transmitted and received via the transceiver 520, the base band communications module, and/or the network communications module. The processor 528 may also process information sent to the transceiver 520 for transmission via the antenna 536 to the network communications module for transmission to a core network.

One or more presentation components 538 present data to a person or another device. Examples of presentation components 538 include a display device, a speaker, a printing component, and a vibrating component, etc.

In view of the present disclosure, it is obvious that various techniques may be used for implementing the concepts in the present disclosure without departing from the scope of those concepts. Moreover, while the concepts have been disclosed with specific reference to certain implementations, a person of ordinary skill in the art may recognize that changes may be made in form and detail without departing from the scope of those concepts.

As such, the disclosed implementations are to be considered in all respects as illustrative and not restrictive. It should also be understood that the present disclosure is not limited to the particular implementations disclosed and many rearrangements, modifications, and substitutions are possible without departing from the scope of the present disclosure.

What is claimed is:

1. A user equipment (UE) comprising:
   one or more non-transitory computer-readable media having computer-executable instructions embodied therein; and
   at least one processor coupled to the one or more non-transitory computer-readable media, the at least one processor configured to execute the computer-executable instructions to:
   receive a first sidelink (SL) control information (SCI) format from another UE, the first SCI format including resource allocation information of a second SCI format different from the first SCI format;
   receive the second SCI format from the another UE based on the first SCI format, the second SCI format including a channel state information (C SI) request field and a source identifier (ID) field corresponding to the another UE; and
   generate a CSI report triggered by receiving the second SCI format.

2. The UE of claim 1, wherein the at least one processor is further configured to execute the computer-executable instructions to:
   receive an SL reference signal (RS) configuration for SL CSI measurement, the SL RS configuration including at least one of a channel state information reference signal (CSI-RS), a sounding reference signal (SRS), an automatic gain control (AGC) training RS, and a demodulation reference signal (DM-RS).

3. The UE of claim 2, wherein the SL RS configuration is received via SL radio resource control (RRC) signaling from the another UE.

4. The UE of claim 2, wherein a period of the CSI-RS is the same as a period of a physical SL control channel (PSCCH) transmission.

5. The UE of claim 2, wherein the at least one processor is further configured to execute the computer-executable instructions to:
perform the SL CSI measurement at a first time based on the SL RS configuration to generate the CSI report;
perform sensing to obtain a radio resource for transmitting the CSI report, the radio resource allocated at a second time; and
drop the CSI report when a time difference between the first time and the second time is greater than a threshold.

6. The UE of claim 2, wherein the CSI report includes at least one of a bandwidth part (BWP) identifier (ID), a carrier ID, and a resource pool ID based on the SL RS configuration.

7. The UE of claim 1, wherein the second SCI format further includes resource allocation information for transmitting the CSI report.

8. The UE of claim 1, wherein the at least one processor is further configured to execute the computer-executable instructions to:
determine an SL channel condition; and
transmit the CSI report to the another UE when the SL channel condition has a quality value that is greater than a threshold quality value.

9. The UE of claim 8, wherein the at least one processor is further configured to execute the computer-executable instructions to:
determine the SL channel condition based on at least one of an SL reference signal received power (SL-RSRP), an SL signal to interference plus noise ratio (SL-SINR), a channel busy ratio (CBR), and a channel occupancy ratio (CR).

10. The UE of claim 1, wherein the at least one processor is further configured to execute the computer-executable instructions to:
transmit a third SCI format to the another UE, the third SCI format including a CSI indication field and resource allocation information of a first physical SL shared channel (PSSCH) transmission, the CSI indication field indicating that the first PSSCH transmission includes the CSI report.

11. The UE of claim 10, wherein the second SCI format further includes resource allocation information of a second PSSCH transmission, and the at least one processor is further configured to execute the computer-executable instructions to:
transmit the CSI report to the another UE in the second PSSCH transmission when the CSI request field indicates that the CSI report is triggered; and
receive data from the another UE in the second PSSCH transmission when the CSI request field indicates that the CSI report is not triggered.

12. A method for sidelink (SL) channel state information (CSI) acquisition performed by a user equipment (UE), the method comprising:
receiving a first SL control information (SCI) format from another UE, the first SCI format including resource allocation information of a second SCI format different from the first SCI format;
receiving the second SCI format from the another UE based on the first SCI format, the second SCI format including a channel state information (CSI) request field and a source identifier (ID) field corresponding to the another UE; and
generating a CSI report triggered by receiving the second SCI format.

13. The method of claim 12, further comprising:
receiving an SL reference signal (RS) configuration for SL CSI measurement, the SL RS configuration including at least one of a channel state information reference signal (CSI-RS), a sounding reference signal (SRS), an automatic gain control (AGC) training RS, and a demodulation reference signal (DM-RS).

14. The method of claim 13, wherein the SL RS configuration is received via SL radio resource control (RRC) signaling from the another UE.

15. The method of claim 13, wherein a period of the CSI-RS is the same as a period of a physical SL control channel (PSCCH) transmission.

16. The method of claim 13, further comprising:
performing the SL CSI measurement at a first time based on the SL RS configuration to generate the CSI report;
performing sensing to obtain a radio resource for transmitting the CSI report, the radio resource allocated at a second time; and
dropping the CSI report when a time difference between the first time and the second time is greater than a threshold.

17. The method of claim 12, wherein the second SCI format further includes resource allocation information for transmitting the CSI report.

18. The method of claim 12, further comprising:
determining an SL channel condition; and
transmitting the CSI report to the another UE when the SL channel condition has a quality value that is greater than a threshold quality value.

19. The method of claim 12, further comprising:
transmitting a third SCI format to the another UE, the third SCI format including a CSI indication field and resource allocation information of a first physical SL shared channel (PSSCH) transmission, the CSI indication field indicating that the first PSSCH transmission includes the CSI report.

20. The method of claim 19, wherein the second SCI format further includes resource allocation information of a second PSSCH transmission, and the method further comprising:
transmitting the CSI report to the another UE in the second PSSCH transmission when the CSI request field indicates that the CSI report is triggered; and
receiving data from the another UE in the second PSSCH transmission when the CSI request field indicates that the CSI report is not triggered.

* * * * *